United States Patent [19]

Burmenko

[11] Patent Number: 4,644,247
[45] Date of Patent: Feb. 17, 1987

[54] SERIES PASS REGULATED BATTERY CHARGER WITH REDUCED POWER DISSIPATION

[75] Inventor: Mark Burmenko, Fairlawn, N.J.

[73] Assignee: Cooper Industries, Inc., Houston, Tex.

[21] Appl. No.: 587,951

[22] Filed: Mar. 9, 1984

[51] Int. Cl.$^4$ .......................... H02J 7/04; G05F 1/58
[52] U.S. Cl. .......................................... 320/39; 307/77; 320/56; 320/DIG. 1; 323/269
[58] Field of Search ............... 320/7, 56, 13–16, 320/57, 59, 39, DIG. 1; 323/269–272, 906; 307/46–50, 77, 81

[56] References Cited

U.S. PATENT DOCUMENTS

| | | | |
|---|---|---|---|
| 3,217,228 | 11/1965 | Jardine | 320/57 X |
| 3,443,115 | 5/1969 | Timmerman, Jr. | 320/3 X |
| 3,474,324 | 10/1969 | Arnold | 323/906 X |
| 3,496,450 | 2/1970 | Thiele | 320/17 X |
| 3,843,918 | 10/1974 | Rhyne | 320/59 X |
| 4,395,639 | 7/1983 | Bring | 320/13 X |

Primary Examiner—R. J. Hickey
Attorney, Agent, or Firm—Nelson A. Blish; Eddie E. Scott; Alan R. Thiele

[57] ABSTRACT

A series pass battery charger is disclosed which comprises at least two input voltage sources, a series pass element and a power dissipation control circuit which is operatively connected to the series pass element. The power dissipation control circuit senses the voltage difference between the input voltages sources and the DC output voltage of the battery charger and controls the voltage applied to the series pass element. During periods of excessive power dissipation, the control circuit decreases the amount of the input voltage applied to the series pass element thereby greatly reducing the power dissipated.

14 Claims, 6 Drawing Figures

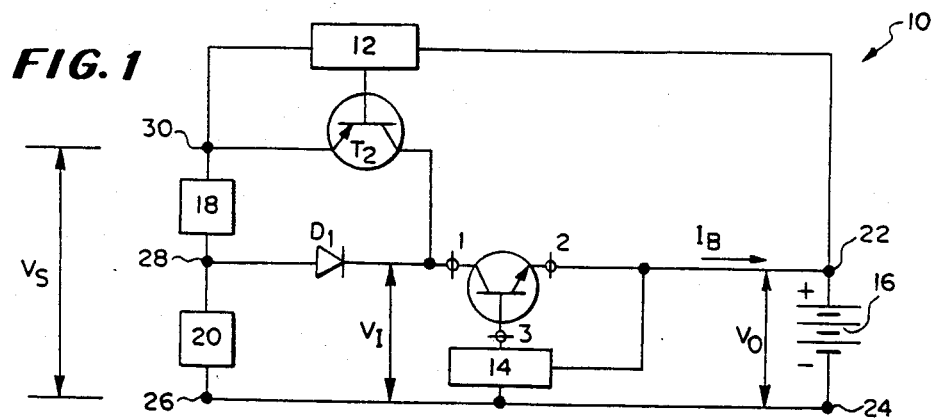

SERIES PASS REGULATED BATTERY CHARGER WITH REDUCED POWER DISSIPATION

TECHNICAL FIELD

The present invention relates to battery chargers in general, and more particularly to series pass battery chargers.

BACKGROUND

Batteries are frequently used as sources of motive and control power in certain applications where a temporary loss of power would not be acceptable. These applications are primarily industrial, such as boiler controls, computer power supplies and even sensitive control systems in nuclear power plants. Similarly, there are commercial applications where a in backup power supply must be provided, such as in hospitals and backup lighting systems which function when normal AC power is lost. In some cases, batteries are only used as a backup source of power when normal AC power is lost. In other cases, batteries are used as the normal source of power. Consequently, in either case, batteries must be charged periodically such that they are able to supply power as required.

Typically battery chargers use a source of AC power which is rectified to DC to charge the batteries. There are several types of battery chargers. One type is a series pass battery charger, wherein a series pass element is connected between the input voltage source and the DC output terminals. This type of regulator is also called a dissipative type because of the magnitude of power dissipation by the series pass element during certain modes of operation. When the battery is deeply discharged, the power dissipated by the series pass element is at a maximum and is equal to the difference between the input and output voltages multiplied by the maximum charging current. When the battery is deeply discharged, battery voltage is insignificant relative to the input voltage supply source. Therefore, the power dissipated by the series pass element is essentially the input supply voltage multiplied by the charging current. If this condition occurs coincident with a higher than normal input voltage, the power dissipation will be even greater. During these conditions of high power dissipation by the series pass element, overall efficiency of the charger is very poor. Because of the low efficiency of the series pass regulators, other regulator types have become more popular.

Another type of battery charger, the switching type, is used when charger efficiency is of major importance. Switching type battery chargers are also known as non-dissipative battery chargers. This type of charger stores excess power in a filter circuit, delivering power to the battery in measured intervals when a switching element conducts. Power is stored in the filter and delivered to the battery as required. With this approach, little power is dissipated and hence the efficiency is much higher. Examples of switching type regulators can be found in U.S. Pat. Nos. 3,304,489 to Brolen, 4,061,956 to Brown and 4,359,679 to Regan. Although, switching type chargers are more efficient, they are not without drawbacks. One drawback found with this type of charger is that it generates electromagnetic interference. Consequently it requires filtering circuits, whereas series pass regulators generate little or no electromagnetic interference.

Another type of battery charger is the Silicon Controlled Rectifier (SCR) battery charger. In this type of charger, an SCR is used to control the input voltage applied to the filter and the battery as in the switching type. Advantages and disadvantages of this type of battery charger are similar to that of a switching type battery charger. Examples of SCR type regulators can be found in U.S. Pat. Nos. 3,420,440 to Bixby and 3,543,127 to Fry.

Both the switching battery charger and the SCR controlled battery charger have more components than the series pass charger. As a general rule, the more components used in a device, the less reliable it becomes. Also, increasing the number of components adds to cost and complicates troubleshooting because the control circuits are generally more complex. Therefore, even though switching and SCR controlled chargers may be desirable from an efficiency standpoint, they are not as desirable as the series pass charger from a reliability standpoint. Since batteries and battery chargers are often used in situations where a loss of AC power cannot be tolerated, reliability is often a more important factor than efficiency. Therefore, any improvement in the efficiency of series pass battery chargers would be welcomed by the industry. More importantly the lack of an acceptable solution to improving the efficiency of series pass battery chargers demonstrates that there is a long felt need by the industry which has heretofore eluded those skilled in the art.

SUMMARY OF THE INVENTION

In accordance with the present invention a regulated series pass battery charger is disclosed comprising: a plurality of input voltage sources, a pair of regulated DC voltage output terminals, which are adapted to be connected to the battery to be charged, a series pass circuit which is operatively connected to the input voltage sources and to the pair of output DC voltage terminals, so as to regulate the DC output voltage at a constant value independent of both the charging current and of fluctuations in the input AC voltage sources, and a unique power dissipation control circuit.

The power dissipation control circuit senses the voltage difference between the input voltage source and the DC output voltage so as to control the voltage applied to the series pass control element in response to the aforesaid voltage difference. The power dissipated by the series pass element is equivalent to the potential difference between the input voltage source and the output voltage multiplied by the charging current flowing to the battery being charged. During periods when the battery is deeply discharged, the battery voltage is negligible with respect to the input voltage and hence, the power dissipated by the series pass element is essentially the product of the magnitude of the input voltage multiplied by the magnitude of the charging current. This product is at a maximum when the battery is deeply discharged. During this condition, the efficiency of the battery charger is very low. If there is a fluctuation in the supply voltage such that the input voltage source is at the upper end of its range during this condition, the efficiency of the charger becomes even lower.

The invention disclosed herein reduces the power dissipation in the series pass element by splitting the input voltage source into two or more independent voltage sources, thereby controlling the magnitude of the voltage applied to the series pass element during periods of low battery charger efficiency. When the independent input voltage sources are connected in series, the input voltage is sufficient to fully charge the battery connected to the DC output terminals. By reducing the voltage level applied to the series pass element, power dissipation is reduced by a proportionate amount.

Several embodiments of the invention are disclosed which incorporate a novel circuit of this invention to decrease the power dissipation of the series pass element. In all embodiments, efficiency of the battery charger is improved with a minimal overall effect on the reliability. Numerous other advantages and features of the present invention will become readily apparent from the following description of various embodiments of the invention, from the claims, and from the accompanying drawings.

BRIEF DESCRIPTION OF DRAWINGS

FIG. 1 is a simplified schematic circuit diagram of a series pass battery charger with a one step power dissipation control circuit in accordance with this invention.

FIG. 2 is a schematic circuit diagram of the power dissipation control circuit shown in FIG. 1.

FIG. 3 is a simplified schematic circuit diagram of a series pass battery charger circuit with a two step power dissipation control circuit in accordance with this invention.

FIG. 6 is a schematic circuit diagram of two transistors connected as a Darlington pair in accordance with this invention.

DETAILED DESCRIPTION OF THE INVENTION

Figure 4:
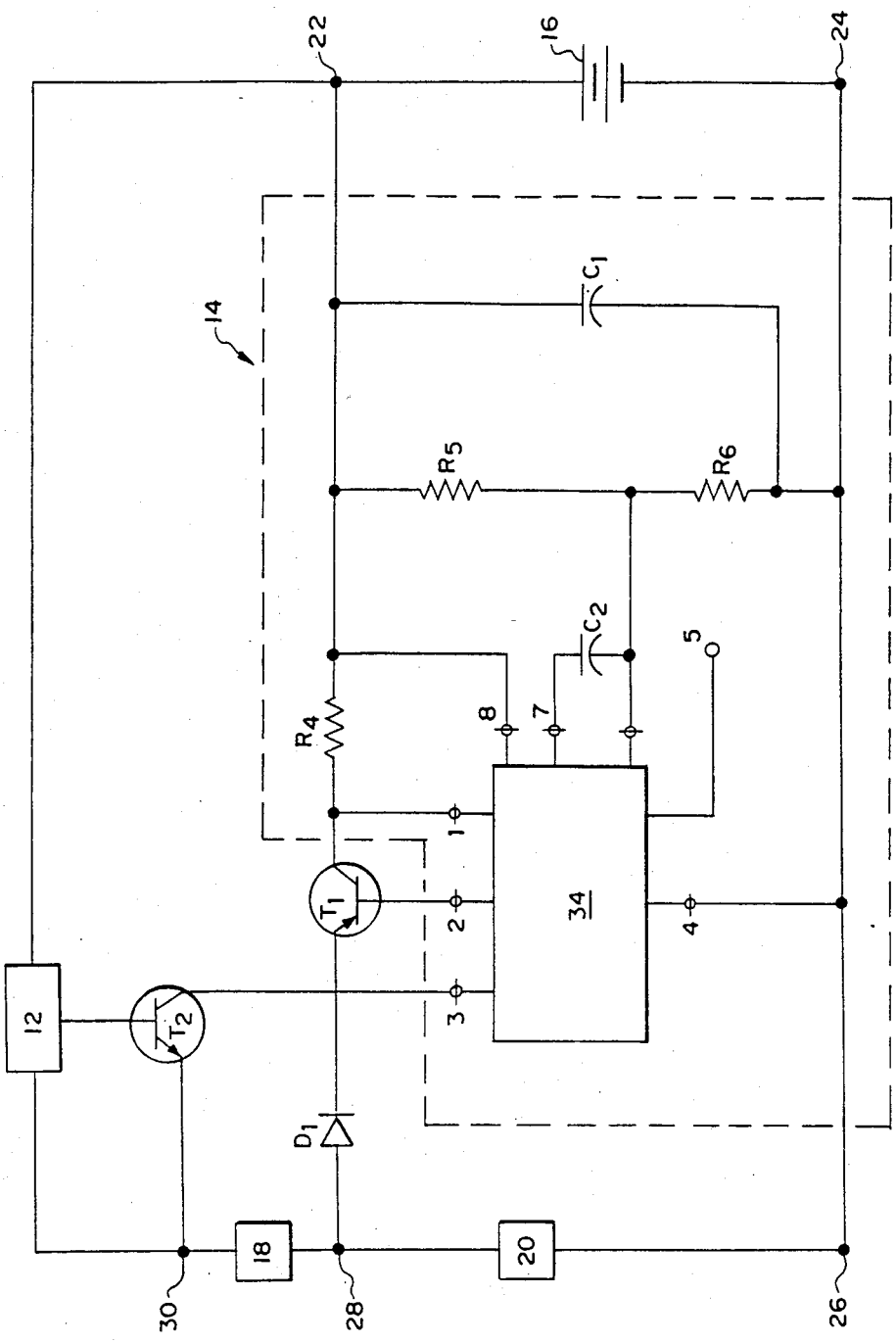
FIG. 4 is a schematic circuit diagram of a battery charger circuit with an external series pass transistor and monolithic battery charger control in accordance with this invention.

While this invention is susceptible of embodiment in many different forms, there are shown in the drawings, which will herein be described in detail, several embodiments of the invention. It should be understood however, that the present disclosure is to be considered an exemplification of the principles of the invention and is not intended to limit the invention to any of the specific embodiments illustrated.

Figure 5:
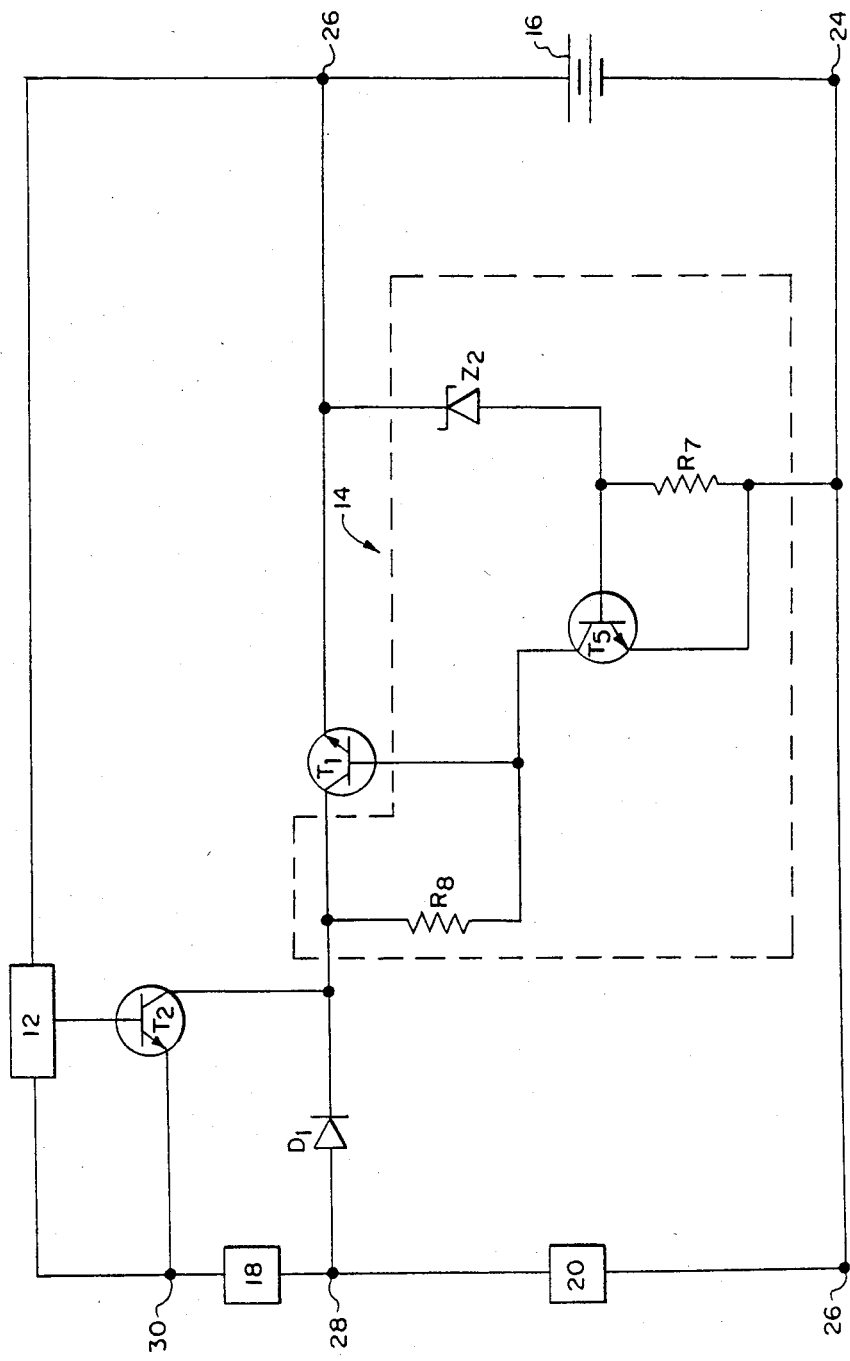
FIG. 5 is a schematic circuit diagram of battery charger circuit comprised of discrete components in accordance with this invention.

Turning to the drawings, FIG. 1 represents a series pass battery charger 10 which is the subject of the present invention. The battery charger circuit includes: a power dissipation control circuit 12 (further illustrated in FIG. 2), a series pass element T1, a transistor T2, and a battery charger control circuit 14. The battery charger control circuit 14 has several embodiments which are illustrated in FIGS. 4, 5 and 6. Those skilled in the art know that conventional series pass battery chargers are dissipative devices. The power dissipated by these devices is equivalent to the difference between input voltage $V_I$ and the output voltage $V_o$ multiplied by the charging current delivered to the battery 16 connected to the DC output terminals 22 and 24. When the battery 16 is deeply discharged, the output voltage $V_o$ is negligible with respect to the source voltage $V_s$ and the charging current is at a maximum. Under these conditions, the power dissipated by the series pass element is a maximum, and is approximately the voltage $V_I$ multiplied by the maximum charging current. Also, under these conditions, the efficiency of the battery charger is minimal. Since the power dissipation is proportional to the input voltage $V_I$, any upward fluctuation in the voltage source when charging a deeply discharged battery makes power dissipation greater and the battery charger efficiency even worse. Conventional series pass battery chargers utilize a single voltage source in which case $V_s$ is always equivalent to $V_I$ (see FIG. 1). Since the efficiency of the battery charger is equivalent to $V_o/V_I$, a reduction in $V_I$ will increase the efficiency. The present invention relates to utilizing multiple voltage sources some of which can be switched off during conditions of low efficiency, thereby reducing $V_I$ and increasing the efficiency.

FIG. 1 depicts the source voltage $V_s$ as a DC source, such as from an independent battery source. The power dissipation control circuit 12 functions equally as well from any DC source. Alternate embodiments would include the output of full wave rectifiers with AC voltage inputs and DC voltages supplied from motor generator sets. In FIG. 1, the input voltage source $V_s$ comprises two voltage sources 18 and 20 which are connected in series through a common terminal 28. One voltage source 18 is connected to transistor T2 and to one side of the power dissipation control circuit 12. The other side of the power dissipation control circuit 12 is connected to the positive DC output terminal to which the battery 16 is connected. The negative DC output terminal 24 of the charger 10 is connected to the regulator circuit 14 and to the negative side 26 of the other voltage source 20. The regulator circuit 14 is connected to the DC output terminals 22 and 24 and to the series pass element T1. Diode D1 is connected between the input voltage sources at terminal 28 and series pass element T1. The diode D1 functions to prevent collector current from transistor T2 backfeeding the two power sources 18 and 20. The power dissipation control circuit 12 is connected to input voltage source 18, through terminal 30, and to the positive side of the battery 16, via terminal 22 and to transistors T1 and T2. The power dissipation control circuit 12 is illustrated in FIG. 2.

Referring now to FIG. 2, the power dissipation control circuit 12, which is a primary aspect of this invention, is illustrated. The power dissipation control circuit 12 is comprised of three resistors R1, R2, and R3, a PNP transistor T3 and Zener diode Z1. During abnormal conditions when the battery 16 (see FIG. 1) is fully discharged, or series input voltage sources 18 and 20 are too high, the voltage difference between terminals 22 and 30 will exceed the Zener diode Z1 breakdown voltage (also called avalanche voltage) and Zener diode Z1 will conduct. When Zener diode Z1 conducts, current will flow through the power dissipation control circuit 12. This will cause a voltage drop across resistors R1 and R2. The polarity of the voltage drop across resistors R1 and R2 makes the emitter of transistor T3 positive with respect to the base. Since transistor T3 is a PNP type, this polarity will cause transistor T3 to conduct. Resistor R3 functions to limit collector current in transistor T3 and to reverse bias transistor T2. The resistors R1, R2 and R3 are selected such that when Zener diode Z1 is conducting, transistor T3 is also conducting. The collector current of transistor T3 causes a voltage drop in resistor R3. The polarity of the voltage drop across resistor R3 is such that the base voltage of transistor T2 is almost equal to the emitter voltage of transistor T2 which will cause transistor T2 to turn "off". When transistor T2 is "off", the associated input voltage source 18 is isolated from the collector of the series pass element T1. Thus, only one input source 20 is applied to the collector of series pass element T1. Since the power dissipated in the series pass element is proportional to the input voltage under conditions of deep battery discharge, the power dissipation is reduced by an amount proportional to the magnitude of the voltage of the input source 18. With the power dissipation reduced, the overall efficiency of the charger is proportionately improved.

During normal conditions when the battery 16 voltage rises to its nominal value or the input voltages 18 and 20 drop, the voltage between terminals 22 and 30 is less then the breakdown voltage of the Zener diode Z1. Since no current is flowing in the power dissipation control 12 during this condition there will be no voltage across resistor R1. Hence, transistor T3 will turn "off" and transistor T2 will turn "on" since the emitter to base voltage will be positive, thus connecting full input voltage (sources 18 and 20) to the collector of transistor T1. When transistor T2 is conducting, the voltage at the collector of series pass element T1 is essentially equivalent to the input source potential Vs.

FIG'S. 1 and 2 depict a single power dissipation control circuit and an input voltage source formed from two sources. The invention disclosed is adaptable to cascading, with the input voltage sources comprising more than two sources. FIG. 3 represents an embodiment with two power dissipation control circuits 12 and 13 and three input voltage sources 18, 20 and 32. Power dissipation control circuit 13 is identical to power dissipation control circuit 12 previously described. The operation of the circuit illustrated in FIG. 3 is identical to the operation of the circuit shown in FIG. 1, except that the voltage across the series pass element T1, during periods of deep battery discharge, or during periods of high input voltage, is reduced in two steps. In other words, the voltage applied to the collector of series pass element T1 is reduced in a first step from the sum of the three input sources 18, 20 and 32 to the value equivalent to two input sources 18 and 20. The second step consists of reducing the voltage applied to the collector of series pass element T1 from the sum of the two sources 18 and 20 to that of source 20 only. The voltage of the sources are selected according to the characteristics of the battery under charge. Input source 20 is generally selected to have an output voltage equal to the lowest potential of a battery to be charged. The sum total voltage of the input voltage sources must be above or equal to the maximum allowable charging potential of the particular battery to be charged.

The Zener diode Z1 in the power dissipation control circuit 12 should be selected to have a breakdown voltage to correspond to the voltage of source 18 (or the value of the desired step). In other words, the reverse bias breakdown potential across the Zener diode Z1 should be equal to the voltage of the source 18. In the two step circuit, depicted in FIG. 3, the Zener diode (not shown) in power dissipation circuit 13 should be selected such that its reverse bias breakdown potential is equal to the voltage of source 32. In alternate embodiments with more than two steps, the Zener diode reverse breakdown voltage should correspond to the value of the respective voltage steps corresponding to the input The power dissipation control circuit 12 in FIG. 1 is adaptable to any battery charger circuit that utilizes a series pass element T1. Several embodiments of the regulator circuit 14 shown in FIG. 1 are illustrated in FIGS. 4, 5 and 6.

FIG. 4 depicts a regulator circuit 14 comprised of a monolithic block 34, three resistors R4, R5, R6, and two capacitors C1 and C2. The regulator 14 circuit is enclosed within dashed lines. The monolithic regulator 14 is used in conjunction with an external series pass element T1. The external series pass element T1 is used to increase the current capacity, since the monolithic elements are generally unable to handle relatively high currents. Additional current carrying capability can be obtained by connecting additional series pass elements in parallel with series pass element T1.

FIG. 4 illustrates the use of a National Semiconductor Corporation LM105 monolithic regulator as block 34. There are numerous monolithic regulators on the market and the invention disclosed herein is adaptable to be used with the many monolithic regulators currently available. Monolithic regulator 34 has eight terminals, one of which is unused. External resistors R4, R5 and R6 and capacitors C1 and C2 are connected to monolithic regulator 34. Resistor R4 provides current sensing to monolithic regulator 34, wherein the voltage drop across it is applied to the emitter-base junction of a transistor within monolithic regulator 34. Resistors R5 and R6 conform the output voltage divider-sensor. Capacitor C2 compensates for the instability of the error amplifier in the monolithic regulator 34. Capacitor C1 suppresses oscillations and provides low output impedance when the DC output voltage contains a high frequency AC.

The operation of the circuit is as set forth alone with respect to FIG. 1. The power dissipation control circuit 12 functions to reduce the power dissipation of series pass element T1. The monolithic regulator 34 functions to keep the voltage applied between battery terminals 22 and 24 constant, independent of both charging current to the battery and fluctuations in the input voltage sources and to limit the charging current. The monolithic regulator 34 contains a Zener reference voltage source and senses the difference between the output voltage and a predetermined voltage. Finally, the voltage difference drives the series pass element T1.

Monolithic regulators are available that will operate with an input voltage up to 1000 volts. Series pass elements are available which will handle currents in excess of 60 amperes. The monolithic regulator 34 is only one embodiment that is capable of utilizing the invention. The invention disclosed is generally adaptable to most monolithic regulators that drive external pass transistors.

FIG. 5 illustrates a regulator control circuit 14 comprised of discrete components. Regulator control circuit 14 is shown inside dashed lines. The regulator control circuit 14 is comprised of a Zener diode Z2, an NPN transistor T5, and two resistors R7 and R8. Zener diode Z2 acts as a voltage reference source. When the battery voltage level is too low the Zener Z2 is reverse biased. The zener diode Z2 conducts when the voltage applied to it exceeds its avalanche voltage (output voltage too high). When Zener diode Z2 is conducting, a current will flow through resistor R7 causing a voltage drop across the base emitter junction of transistor T5. This biases transistor T5 into conduction. Transistor T5 amplifies the voltage difference (or error) signal and drives current through resistor R8, biasing transistor T1 "off" and reducing the output voltage Vo. The operation of the power dissipation control circuit 12 in this embodiment has previously been described with respect to FIG. 2.

FIG. 6 illustrates embodiments wherein the series pass transistor T1, can be replaced with two transistors T1' and T1" connected on what is known in the art as a Darlington pair. Transistors T1' and T1" can be connected to the circuit in FIG. 1 by disconnecting transistor T1 from terminals 1, 2 and 3 and reconnecting transistors T1' and T1" as shown. The Darlington pair feature can be used with a battery charger circuit wherein a high input impedance is desired.

In summary, the power dissipation control circuit 12 may be used with any battery charger circuitry that utilizes a series pass transistor. FIGS. 4 and 5 are not meant to illustrate the entire spectrum of embodiments which can utilize the power dissipation control circuit of this invention. Rather, they are merely representative. For instance, by replacing the battery 16 in FIG. 1 with a load resistor, the above invention can be utilized in regulated power supply circuits where constant output voltage, independent of load current, is required.

Thus, it should be apparent that a unique battery charger circuit has been disclosed. While the invention is described in conjunction with several specific embodiments, it should be evident that there are many alternatives, modifications and variations which will be apparent to those skilled in the art in light of the foregoing description. For example, in FIG. 1, two rectified AC input sources may be used instead of the DC input sources illustrated. Similarly, the Zener diode Z3 and the transistors T5 in FIG. 5 may be replaced by a conventional differential amplifier. Accordingly, it is intended to cover all such alternatives, modifications and variations within the spirit and scope of the appended claims.

I claim:

1. A series pass battery charger, comprising:
  a plurality of input voltage sources;
  a pair of DC output terminals adapted to be connected to a battery to be charged;
  a series pass control means for regulating the voltage at said DC output terminals at a relatively constant DC voltage independent of voltage fluctuations in said input voltage sources and fluctuations in the charging current flowing through said DC output terminals; and
  a power dissipation control means for controlling the magnitude of input voltage applied to said series pass control means in response to the voltage difference between said DC voltage output terminals and the sum of the voltage of said first and second input voltage sources such that the power dissipated through said series pass control means is decreased when the voltage difference exceeds a preselected value.

2. The battery charger set forth in claim 1, wherein said series pass control means comprises:
  at least one series pass transistor operatively connected between said DC output terminals and said two input voltage sources, and
  a monolithic regulator means, operatively connected to said DC output terminals and to said input voltage sources and to said series pass element, for biasing said series pass element in response to the voltage difference between the input voltage sources and the DC output terminals.

3. The battery charger set forth in claim 1, wherein said series pass control means includes one transistor having a collector junction; and
  wherein said series pass control means includes:
  a monolithic regulator means, operatively connected between the DC output terminals and the input voltage sources, for sensing the voltage difference between said input voltage sources and DC output terminals and amplifying said difference to bias said transistor and,
  a first external resistor, operatively connected between said collector of said transistor and said monolithic regulator means for providing current limiting.

4. The battery charger set forth in claim 3, wherein said series pass control means further includes a first external capacitor, operatively connected to said monolithic regulator means for suppressing voltage oscillations in said battery charger.

5. The battery charger set forth in claim 4, wherein said series pass control means further includes a second external capacitor, operatively connected to said DC output terminals for compensating instability of said monolithic regulator means.

6. The battery charger set forth in claim 5, wherein said series pass control means further includes a second external resistor connected in series with said first external resistor means and operatively connected to the DC output terminals and to said monolithic regulator means for controlling the output voltage.

7. The battery charger set forth in claim 1, wherein the series pass control means comprises:
  at least one series pass transistor, having a collector emitter junction, operatively connecting one of said input voltage sources and DC output terminals;
  a Zener diode means operatively connected to the DC output terminals so as to be responsive to voltage fluctuations at said DC output terminals and said input voltage sources, said Zener diode means providing an error signal when the voltage across said Zener means is equal to its avalanche breakdown voltage,
  a second transistor, having its base connected to said Zener diode, for amplifying the error signal from said Zener diode for use in driving said series pass transistor;
  a first resistor connected between the base and emitter of the second transistor and to bias said second transistor; and
  a second resistor connected between base and emitter of the series pass transistor to bias said series pass transistor.

8. The battery charger set forth in claim 1, wherein the series pass control means comprises:
  a first transistor having a base;
  a second transistor having an emitter, wherein base of said transistor is serially connected to the emitter of said second transistor such that the transistors form a Darlington Pair.

9. The battery charger set forth in claim 1, wherein said input voltage sources comprise at least two external batteries.

10. The battery charger set forth in claim 1, wherein said input voltage sources are derived from DC generator sets.

11. The battery charger set forth in claim 1, wherein said input voltage sources are derived from one or more rectifiers driven by a source of AC voltage.

12. The battery charger set forth in claim 11, further including a transformer for transforming said AC voltage to a preselected magnitude required for charging said battery.

13. A series pass voltage regulator, comprising:
- a plurality of DC input voltage sources including a first input voltage source and a second input voltage source;
- a pair of DC output terminals adapted to be connected to a load which requires a constant voltage supply;
- a series pass control means, operatively connected between said first input voltage source and said DC output terminals, for regulating the voltage at said terminals at a relatively constant DC voltage independent of voltage fluctuations in said voltage input sources and fluctuations in the current flowing to said DC output terminals; and
- a power dissipation control means, operatively connected to said second input voltage source and the DC output terminals, for controlling the magnitude of the input voltage applied to said series pass means in response to the voltage difference between said DC output terminals and said first and second input voltage sources such that the power dissipated by and series pass control means is decreased when the voltage difference exceeds a preselected level.

14. A series pass battery charger, comprising:
- a plurality of input voltage sources including a first input voltage source and a second input voltage source which are connected in series with each other;
- a pair of DC voltage output terminals adapted to be connected to a battery to be charged;
- a series pass transistor means, operatively connected between said first input voltage source and said DC output terminals, for regulating the voltage at said output DC terminals at a relatively constant DC voltage independent of voltage fluctuations in said input voltage sources and fluctuations in the charging current flowing to said DC voltage terminals; and
- a power dissipation control circuit operatively connected to the second DC input voltage source and said DC voltage output terminals said control circuit including a transistor, a Zener diode, a first resistor and a second resistor, said Zener diode being electrically connected across said second input voltage source and the battery to be charged so as to be responsive to voltage difference between the input voltage sources and the DC output terminals, said Zener diode conducting in the reverse direction when said voltage difference is greater than a pre-selected value, said first resistor and said second resistor being arranged to bias said transistor when said Zener diode is conducting so that said second DC input source is connected to said series pass element when said voltage difference is less than a preselected value.

* * * * *